Nov. 1, 1960     H. J. WOOD     2,958,458
COOLING TURBINE
Filed April 4, 1955

HOMER J. WOOD,
INVENTOR.

BY John H. J. Wallace

United States Patent Office 2,958,458
Patented Nov. 1, 1960

2,958,458
COOLING TURBINE

Homer J. Wood, Sherman Oaks, Calif., assignor to The Garrett Corporation, Los Angeles, Calif., a corporation of California Filed Apr. 4, 1955, Ser. No. 498,866

7 Claims. (Cl. 230—116)

The present invention relates generally to fluid circulating devices and is more particularly concerned with a compact, lightweight, high-velocity turbine driven unit used in aircraft and vehicular air-conditioning and refrigeration systems.

The increased demand for higher capacity airconditioning and refrigeration units in modern aircraft, coupled with a strong prohibition against any increase in weight, has necessitated the development of high velocity turbine and fan combinations which far exceed the operational speeds of such units in the past. These higher required speeds of operation, in turn, require better aerodynamic and mechanical design, improved lubrication, and improved cooling means for the necessary shaft bearings.

An object of this invention, therefore, is to provide a turbine driven fluid circulating unit having novel means for lubricating and cooling its bearings.

Another object is to provide a turbine driven fluid circulating unit which is simple in construction and of such design as to operate efficiently at high speeds and yet be no heavier than similar units of lower capacity.

A further object is to provide a very compact, lightweight, turbine driven fluid circulating unit capable of operating at higher speeds and higher capacities than similar units of the prior art.

Further objects and advantages of the invention will be disclosed in the following specification and drawings, wherein a detailed description is given for the purpose of disclosing one embodiment thereof without limting its scope.

Referring to the drawings, which are for illustrative purposes only, and wherein like reference characters denote like parts:

Figure 1:
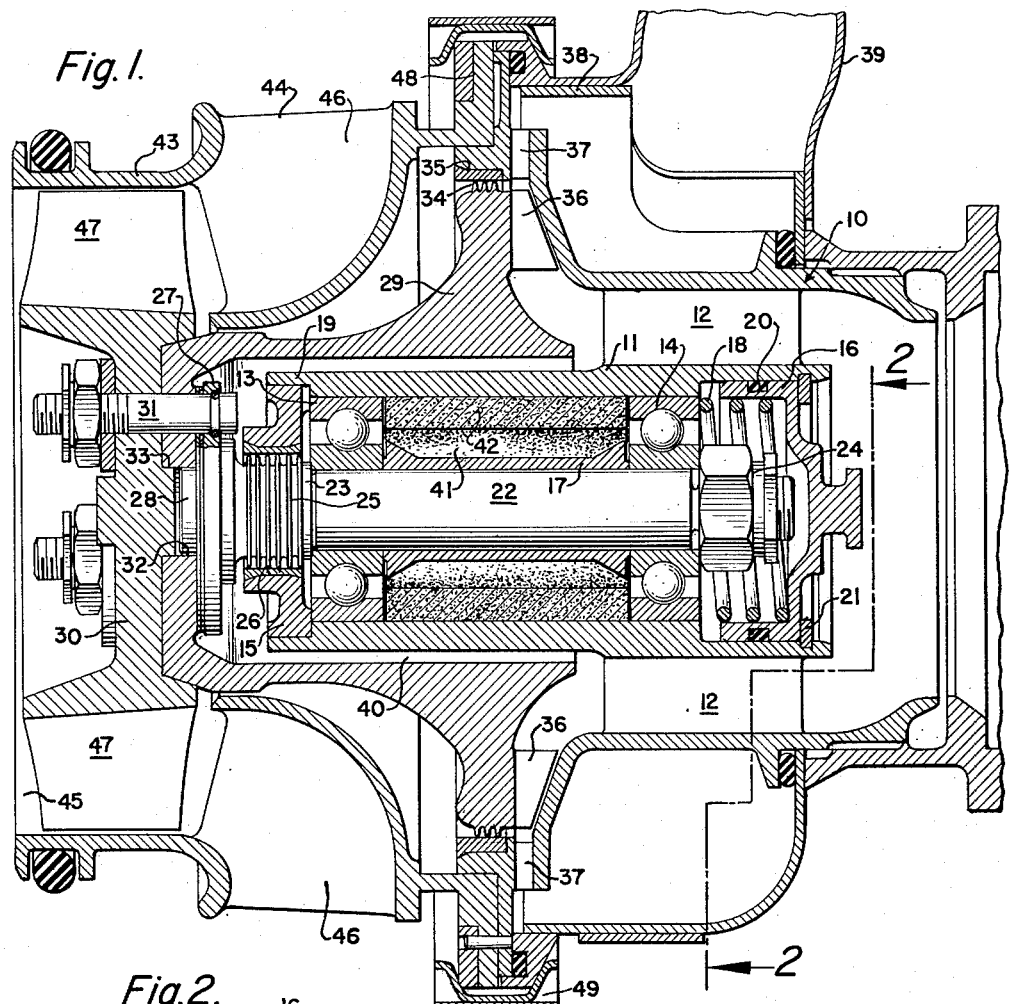
Figure 1 is a longitudinal sectional view of a turbine driven fluid circulating unit embodying the invention.
Figure 2:
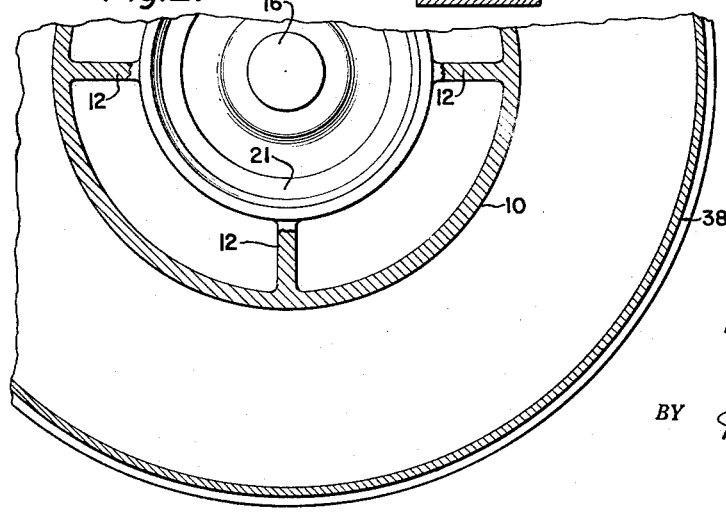
Figure 2 is a partial end elevational view of the turbine end of the unit as taken on line 2—2 of Figure 1.

With reference to Figures 1 and 2, a generally cylindrical turbine shroud is shown at 10. A bearing carrier 11 is mounted concentrically to the turbine shroud 10 by means of vanes or struts 12, brazed or otherwise secured to and between the turbine shroud 10 and bearing carrier 11.

Bearing carrier 11 encases two shaft bearings 13 and 14 which are held in place by means of end plugs 15 and 16, bearing separator 17, and preloading spring 18. End plug 15 may be brazed or otherwise secured in the counterbored end 19 of carrier 11. End plug 16 carries a sealing member 20 and is removably secured in the carrier 11 by means of snap ring 21. Preloading spring 18 serves to preload the outer races of the shaft bearings 13 and 14, thus minimizing end play in the rotating assembly.

Shaft bearings 13 and 14 support shaft 22 which is secured therein by shoulder 23, separator 17 and nut 24. The enlarged portion of the shaft 22, extending leftwardly from shoulder 23, bears a labyrinth type sealing member 25 which co-operates with the sleeve-like sealing member 26 located in the bore of end plug 15. Shaft 22 terminates in a flange 27 which bears on its outer face central boss 28. The deep-hubbed or bell-shaped turbine wheel 29 and fan 30 are secured by a plurality of through bolts 31 to the shaft flange 27. Shaft 22, flange 27, turbine wheel 29 and fan 30 are held in close concentricity by means of the flange boss 28, turbine wheel bore 32 and fan boss 33.

Turbine wheel 29 bears a labyrinth back seal 34 which co-operates with sealing member 35 installed in the interior of turbine shroud 10. This sealing arrangement prevents the hot and high pressure turbine entry air or fluid from escaping over the back of the turbine wheel into the fan passages. Turbine wheel 29 carries a plurality of cantilever blades or buckets 36 which receive power fluid from nozzle ring 37. Turbine shroud 10 and nozzle ring 37 are surrounded by a turbine inlet housing 38 having a duct 39 through which the power fluid is introduced.

Fan 30 is surrounded by fan inlet housing 43 having an inlet duct 44, an outlet or discharge duct 45, and vanes 46. Coolant fluid is introduced through inlet duct 44, passes through the axial blades 47 of fan 30 and then discharges through discharge duct 45. Fan inlet housing 43, turbine shroud 10 and turbine inlet housing 38 are joined as shown at 48 and are held together by means of clamping member 49.

The improved bearing cooling features afforded by my invention are provided in accordance with the following description. Hot, pressurized air or other gaseous fluid enters the turbine inlet housing 38 through duct 39. This hot fluid then passes through the nozzles carried by nozzle ring 37 and impinges on the cantilever blades 36 carried by the turbine wheel 29, thus causing the turbine wheel to rotate at a high velocity. The ensuing adiabatic expansion of the hot, high-pressure fluid and the absorption of energy by the fan-loaded turbine wheel cause the fluid to be cooled rapidly. The cooled fluid then passes over the vane or strut supported portion of the bearing carrier 11 which serves to keep the entire bearing carrier relatively cool. The shaft bearings 13 and 14 borne therein are cooled by heat conduction through the bearing carrier and dissipation therefrom.

An additional cooling feature is afforded by the overhung suspension of the deep-hubbed or bell-shaped turbine wheel 29 and its close proximity to the fan 30. The fan normally becomes quite hot because of the work done by it upon the fluid which it circulates. The comparatively massive and much cooler turbine wheel conducts this heat away from the fan and dissipates it into the cold, expanded fluid turbine discharge before the heat from the fan can pass into the shaft 22 and thus be conducted to the shaft bearings 13 and 14. As can be seen in Figure 1, the bearing carrier 11 is separated from the turbine wheel by an air space 40, which air space affords an insulating thermal barrier.

As shown in Figure 1, no oil sump external to the bearing carrier 11 is provided. An important feature of the improved and weight-saving lubrication system resides in the oil sump 41 being wholly contained within the relatively cool bearing carrier 11. The oil sump 41 may be filled with compressed wool, cotton packing, or other similar oil-absorbing materials as shown at 42.

Upon assembly of the unit, the oil soaked packing material 42 is inserted around the bearing separator 17. At a later overhaul period, the oil sump may be replenished by simply removing end plug 16 and introducing the required, measured small quantity of oil through the bearing 14 into the oil sump packing 42.

Having thus described my lightweight, high speed fluid circulating unit with its improved cooling and lubricating means in a preferred embodiment, I claim:

1. In a turbine driven fluid circulating unit: an outer casing; an inner casing; strut means supporting said inner casing from said outer casing; bearing means carried by said inner casing; a central shaft supported by said bearing means; a turbine wheel surrounding a portion of said inner casing and secured to one end of said central shaft; a fluid circulating unit secured to the said one end of said central shaft and to said turbine wheel, outward of said turbine wheel away from said shaft; and lubricating means for said bearing means wholly contained within said inner casing.

2. In a turbine driven fluid circulating unit: an outer casing including inlet and exhaust ducts for said turbine; an inner casing; strut means supporting said inner casing from said outer casing in the exhaust duct of said turbine; bearing means carried by said inner casing; a central shaft supported by said bearing means; a turbine wheel surrounding a portion of said inner casing and secured to one end of said central shaft; a fluid circulating unit secured to the said one end of said central shaft and to said turbine wheel, outward of said turbine wheel away from said shaft; and means to cool and insulate said inner casing and said bearing means.

3. In a turbine driven fluid circulating unit: an outer casing; an inner casing; spring loaded bearing means contained within said inner casing; a central rotating shaft carried by said bearing means; a turbine wheel surrounding a portion of said inner casing and secured to one end of said central shaft; a fluid circulating unit secured to the said one end of said shaft and to said turbine wheel outward of said turbine wheel away from said shaft; means to conduct relatively hot fluid under pressure to said turbine wheel; means to exhaust the expanded and cooled fluid from said turbine wheel; strut means supporting said inner casing in said turbine exhaust means whereby said inner casing and said bearing means are maintained at a relatively low temperature; means to conduct circulating fluid to and from said fluid circulating unit; and lubricating means for said bearing means wholly contained within said inner casing.

4. A turbine driven fluid circulating unit as described in claim 3, wherein said turbine wheel surrounds a portion of said inner casing and is radially spaced therefrom to provide an insulating space between said turbine wheel and said inner casing.

5. A turbine driven fluid circulating unit as described in claim 3, wherein said inner casing is fully closed at one end and is provided with a plug at the other end, said plug being apertured to accommodate said central shaft and carrying a sealing member within its aperture to co-operate with a labyrinth sealing member carried by said shaft, whereby the interior of said inner casing constitutes a fully enclosed oil sump space.

6. A turbine driven fluid circulating unit as described in claim 3 wherein said inner casing is fully closed at one end by a first removable plug and is provided with an apertured second plug at the other end, said second plug being apertured to accommodate said central shaft and carrying a sealing member within its aperture to co-operate with a labyrinth sealing member carried by said shaft, whereby the interior of said inner casing constitutes an enclosed oil sump space and whereby a measured quantity of oil may be introduced therein without disturbing the rotating assembly comprising said shaft, bearing means, turbine wheel and fan.

7. A turbine driven fluid circulating unit, as described in claim 3, wherein said lubricating means compirses an oil sump consisting of a body of oil-absorbing material disposed between said bearing means in said inner casing and about said shaft.

References Cited in the file of this patent
UNITED STATES PATENTS

| | | |
|---|---|---|
| 2,159,422 | Buchi | May 23, 1939 |
| 2,322,824 | Buchi | June 29, 1943 |